(12) United States Patent
Xiong et al.

(10) Patent No.: US 10,183,403 B2
(45) Date of Patent: Jan. 22, 2019

(54) ROBOT HEAD ROTATING STRUCTURE

(71) Applicant: UBTECH Robotics Corp., Shenzhen (CN)

(72) Inventors: Youjun Xiong, Shenzhen (CN); Wenquan Shu, Shenzhen (CN); Wenhua Yu, Shenzhen (CN); Qi Zhao, Shenzhen (CN); Youpeng Li, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 100 days.

(21) Appl. No.: 15/448,479

(22) Filed: Mar. 2, 2017

(65) Prior Publication Data
US 2018/0186013 A1 Jul. 5, 2018

(30) Foreign Application Priority Data

Dec. 30, 2016 (CN) .......................... 2016 1 1251558
Dec. 30, 2016 (CN) .......................... 2016 1 1251913

(51) Int. Cl.
*B25J 17/00* (2006.01)

(52) U.S. Cl.
CPC .......... *B25J 17/00* (2013.01); *Y10T 74/20329* (2015.01)

(58) Field of Classification Search
CPC ... B25J 17/00; B25J 9/006; B25J 9/104; B25J 17/0241; B25J 9/0021; F16H 2025/2307; F16H 48/38; F16H 57/029; F16H 55/36
USPC ................. 901/21, 27, 28, 50; 446/391, 100
See application file for complete search history.

(56) References Cited

U.S. PATENT DOCUMENTS

| | | | | |
|---|---|---|---|---|
| 2,379,776 | A * | 7/1945 | Young | F16H 55/36 192/48.91 |
| 6,250,276 | B1 * | 6/2001 | Boll | F16H 3/54 123/198 R |
| 8,733,196 | B2 * | 5/2014 | Goppelsroder | F16H 57/025 74/421 A |
| 9,358,682 | B2 * | 6/2016 | Ruiz Morales | B25J 9/041 |
| 2012/0061155 | A1 * | 3/2012 | Berger | B25J 5/007 180/21 |
| 2016/0151921 | A1 * | 6/2016 | Tsagarakis | B25J 19/068 74/490.05 |

FOREIGN PATENT DOCUMENTS

EP 3040581 A1 * 7/2016 .......... F16C 33/7886
WO WO-2015169894 A1 * 11/2015 .......... B25J 19/0091

* cited by examiner

*Primary Examiner* — Jake Cook
*Assistant Examiner* — Bobby Rushing, Jr.

(57) ABSTRACT

A robot head rotating structure includes a housing, a fixing frame, a connection assembly, and a rotary driving apparatus. The housing defines an internal space. The fixing frame is disposed in the internal space. The connection assembly is disposed between the housing and the fixing frame. The rotary driving apparatus is disposed in the internal space. In comparison with the prior art, the robot head rotating structure has the connection assembly disposed between the housing and the fixing frame as well as the rotary driving apparatus, which are capable of enabling the housing to rotate with respect to the fixing frame. As a result, the head of the robot is capable of swinging back and forth as the head of a human stably, and the raising and bowing of the head of the robot can be realized, which improves the automation of the robot.

20 Claims, 13 Drawing Sheets

ROBOT HEAD ROTATING STRUCTURE

CROSS REFERENCE TO RELATED APPLICATIONS

This application claims priority to Chinese Patent Application No. 201611251558.2 filed Dec. 30, 2016 and Chinese Patent Application No. 201611251913.6, filed Dec. 30, 2016, which are hereby incorporated by reference herein in its entirety.

BACKGROUND

1. Technical Field

The present disclosure generally relates to robots, and particularly to a robot head rotating structure.

2. Description of Related Art

At present, robots with general programming capabilities and operational functions are known as intelligent robots, which have a wide range of applications. A traditional intelligent robot mainly includes a head and a trunk. The head is generally directly fixed on the trunk or installed on the trunk via a rotary table in a horizontal rotation manner. Therefore, the head of the robot is incapable of swinging back and forth as the head of a human, and is insufficient in automation.

SUMMARY

The purpose of the present disclosure is providing a robot head rotating structure to resolve the drawback that a robot head is incapable of swinging back and forth as the head of a human and insufficient in automation in the prior art.

According to the present disclosure, a robot head rotating structure is provided. The robot head rotating structure comprises a robot head, a fixing frame, a connection assembly, and a rotary driving apparatus. The robot head comprises a housing defining an internal space. The fixing frame is disposed in the internal space. The connection assembly is disposed between the housing and the fixing frame. The rotary driving apparatus is disposed in the internal space. Wherein, the connection assembly comprises a fixing shaft fixedly connected to the fixing frame and a flange rotatably installed to the fixing shaft, the flange is fixedly connected to the housing, and the rotary driving apparatus is utilized to rotate the flange around the fixing shaft.

Furthermore, the flange is rotatably installed to the fixing shaft through a bearing, the fixing shaft comprises a shaft portion and a chassis portion, wherein the chassis portion is connected to one end of the shaft portion to be fixedly connected with the fixing frame, and the bearing is put around the shaft portion and is supported by the shaft portion.

Furthermore, the shaft portion comprises a sleeve portion and a support portion, wherein the sleeve portion protrudes from a side surface of the chassis portion away from the fixing frame, and the annular support portion protrudes from an outer end surface of the sleeve portion and extends outwardly along the axis of the sleeve portion. The outer end face of the sleeve portion has a first support surface abutting against a side end surface of the bearing, the first support surface surrounds an outer side of the support portion, and an outer peripheral surface of the support portion has a second support surface abutting an inner peripheral surface of the bearing.

Furthermore, the rotary driving apparatus comprises a power source and a transmission mechanism. The transmission mechanism is connected between the power source and the flange. The transmission mechanism comprises a driven wheel fixedly connected with the flange and a driving wheel for driving the driven wheel to rotate, wherein the driving wheel is connected to the power source.

Furthermore, the flange is rotatably installed to the fixing shaft through a bearing, the driven wheel is rotatably put around the bearing, and a limit flange for restricting the movement of the bearing protrudes inwardly from an inner wall of the driven wheel.

Furthermore, the transmission mechanism further comprises a transmission belt wound between the driven wheel and the driving wheel. An anti-separation flange for restricting the movement of the transmission belt protrudes outwardly from an outer wall of the driven wheel.

Furthermore, an outer wall of the driven wheel includes a first tooth portion, an outer wall of the driving wheel includes a second tooth portion, and an inner peripheral surface of the transmission belt includes a third tooth portion engaging with both the first tooth portion and the second tooth portion.

Furthermore, the flange comprises an annular flange portion for fixedly connecting with the housing, an assembly portion for fixedly connecting with the limit flange, and a connection portion connected between the flange portion and the assembly portion.

Furthermore, the robot head rotating structure further comprises two connection assemblies. The two connection assemblies are disposed on two sides of the fixing frame in a bilateral manner.

Furthermore, the housing is spherical in shape and comprises a front case and a rear cover. The front case and the rear cover enclose to form the internal space, and the front case is locked with the rear cover through the flange.

Furthermore, the robot head rotating structure further comprising a support base for supporting the head of the robot. The housing is rotatably connected to the fixing frame such that the housing is capable of rotating with respect to the fixing frame about the fixing shaft, the support base has an installation post. The fixing frame comprises a locking frame for fixedly connecting with the installation post. The housing defines an opening for the installation post to pass therethrough, and a shielding part for shielding the opening is disposed in the internal space.

Furthermore, the housing comprises a front case and a back cover connecting with each other, wherein the rear cover comprises a recess having a chute, and the opening is on a bottom surface of the chute. The shielding part comprises a circular-arc-shaped baffle for engaging into the chute, and the baffle has a combination portion protruding from one side of a middle portion of the baffle for connecting with the installation post.

Furthermore, the baffle is put around the installation post and supported by the installation post, the combination portion has an installation hole for the installation post to pass therethrough, and a fixing mechanism for fixedly connecting the installation post and the locking frame is disposed between the installation post and the locking frame.

Furthermore, the locking frame comprises a fixing board, the installation post comprises an end cover plate for abutting against the fixing board, and the fixing mechanism comprises a first fixing hole formed on the end cover plate and a second fixing hole formed on the fixing board and corresponding to the first fixing hole.

Furthermore, two sides of the combination portion are disposed with connection straps, and two sides of the fixing board define support slots for the connection straps to slide into.

Furthermore, a positioning structure is disposed between the combination portion and the installation post, and the positioning structure comprises a positioning slot formed on the combination portion and a protrusion portion protruding from an outer peripheral surface of the installation post and being capable of sliding into or out of the positioning slot.

Furthermore, the combination portion is disposed with a limit clip for restricting the movement of the combination portion with respect to the installation post.

Furthermore, the installation post has a hollow structure, and the end cover plate defines a wire hole.

Furthermore, the baffle has a reinforcing bar.

Furthermore, the support base further comprises a support wall portion, the installation post is connected to the support wall portion, and the support wall portion has a wire groove.

In comparison with the prior art, the robot head rotating structure has the connection assembly disposed between the housing and the fixing frame as well as the rotary driving apparatus, which are capable of enabling the housing to rotate with respect to the fixing frame. As a result, the head of the robot is capable of swinging back and forth as the head of a human stably, and the raising and bowing of the head of the robot can be realized, which improves the automation of the robot.

Other objects, advantages and novel features of the invention will become more apparent from the following detailed description when taken in conjunction with the accompanying drawings.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

In order that the technical problems, technical solutions and advantageous effects to be solved by the present invention can be more clearly understood, the present invention will be described in more detail with reference to the accompanying drawings and examples. It is to be understood that the described embodiments are a part of embodiments of the present invention, and not all embodiments. Based on the described embodiments of the present invention, all other embodiments obtained by those ordinary skilled in the art without the use of inventive labor are within the scope of the present invention.

In order to enable those skilled in the art to better understand the technical solution of the present invention, the implementation of the present invention will be described in detail below with reference to specific drawings.

The direct or location relationships indicated by the terms "front", "back", "left", "right", "upper", "lower" and the like are based on the orientation or positional relation shown in the drawings, which are merely for the convenience to describe the present disclosure and for simplifying the descriptions, rather than indicating or implying the descripted apparatus or component need to have a particular orientation and constructed/operated in the particular orientation, and therefore can't be comprehended as the limitations to this disclosure.

Unless otherwise defined, technical terms or scientific terms used herein should be in the ordinary meaning as understood by those ordinary skilled in the art. The terms "the first" and "the second" and the like are merely for the convenience of description, and can't be comprehended as indicating/implying the order, the amount, or the relative importance of the descripted technical characteristic. Therefore, the characteristics limited by "the first" and "the second" could include one or more of the characteristics expressly or implicitly. Likewise, the terms "a" or "one" and the like do not denote a numerical limitation, but rather denote the presence of at least one.

FIG. 1 to FIG. 8 shows a preferred embodiment of a robot head rotating structure of the present disclosure.

Figure 1:
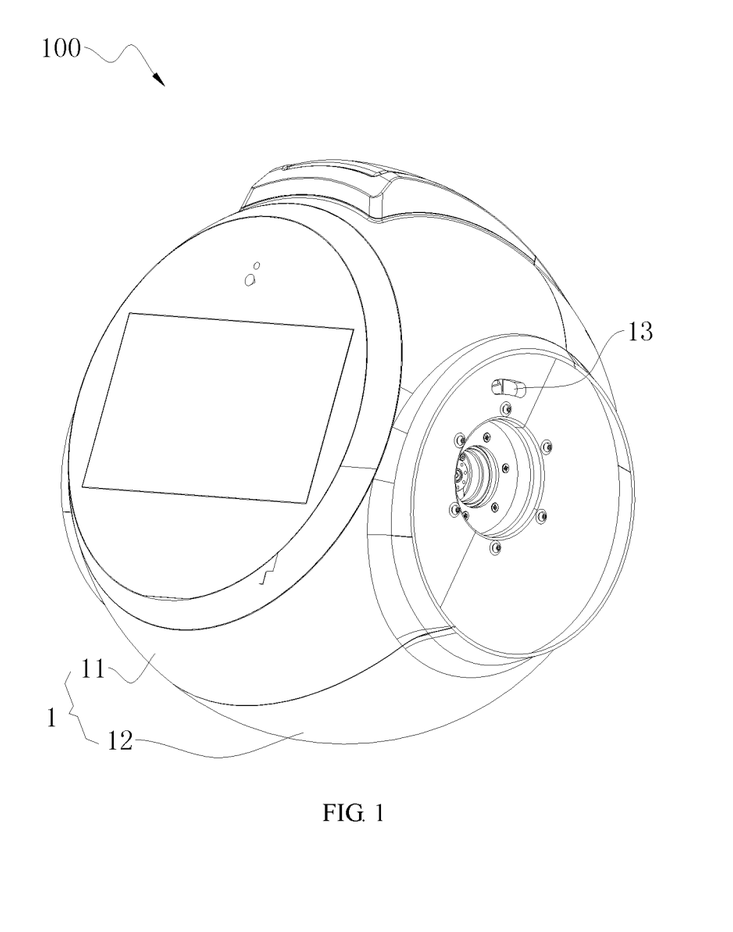
FIG. 1 is a three dimensional view of a robot head according to an embodiment of the present disclosure.
Figure 2:
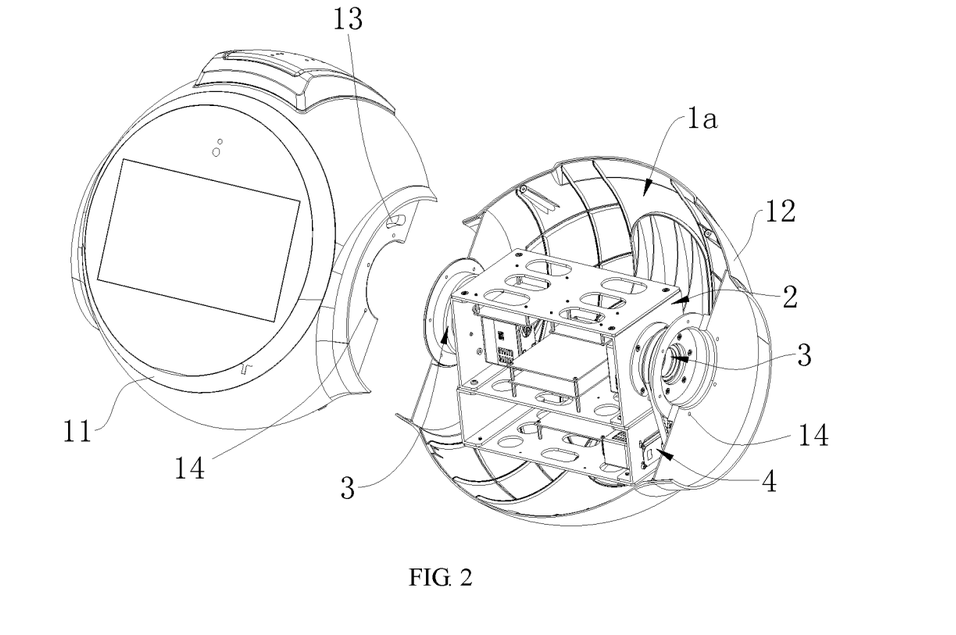
FIG. 2 is an exploded view of a robot head according to an embodiment of the present disclosure.
Figure 4:
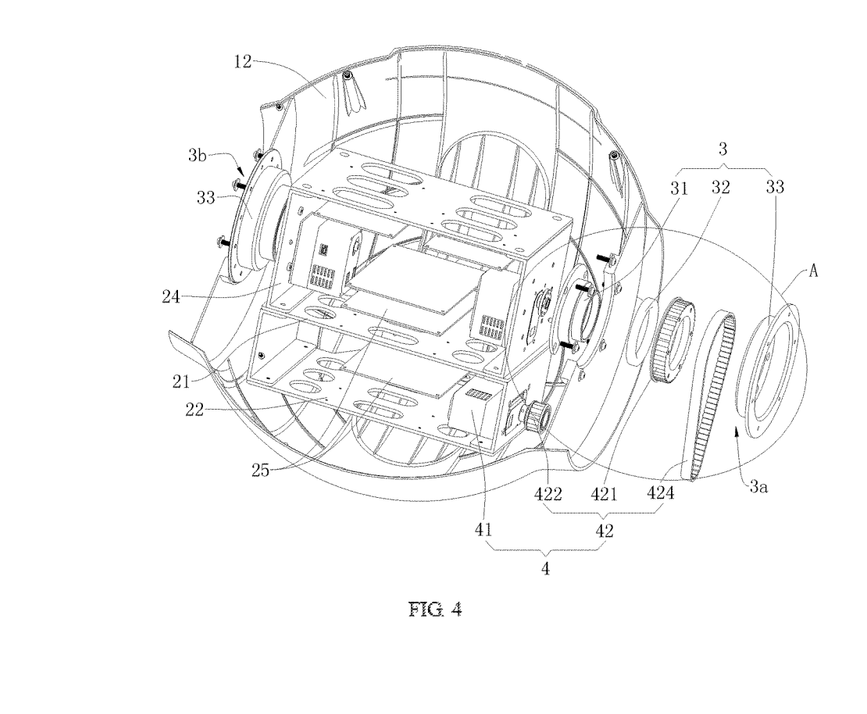
FIG. 4 is an exploded view of a fixing frame, a connection assembly, and a transmission mechanism according to an embodiment of the present disclosure.
Figure 5:
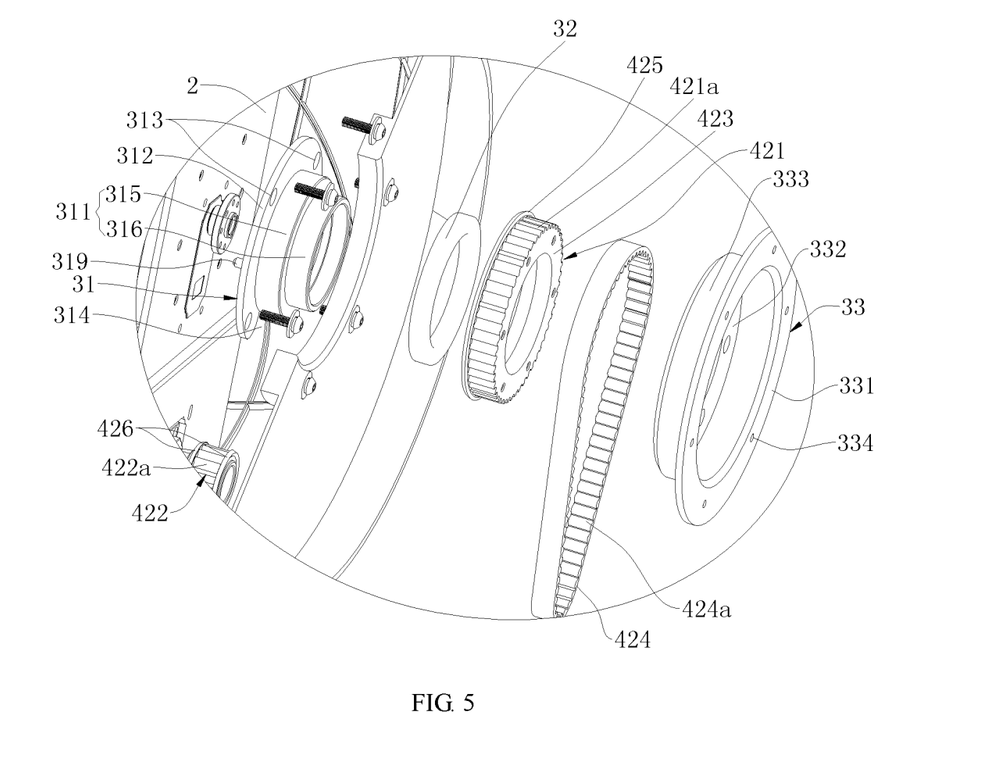
FIG. 5 is an enlarged view of part A of FIG. 4.
Figure 6:
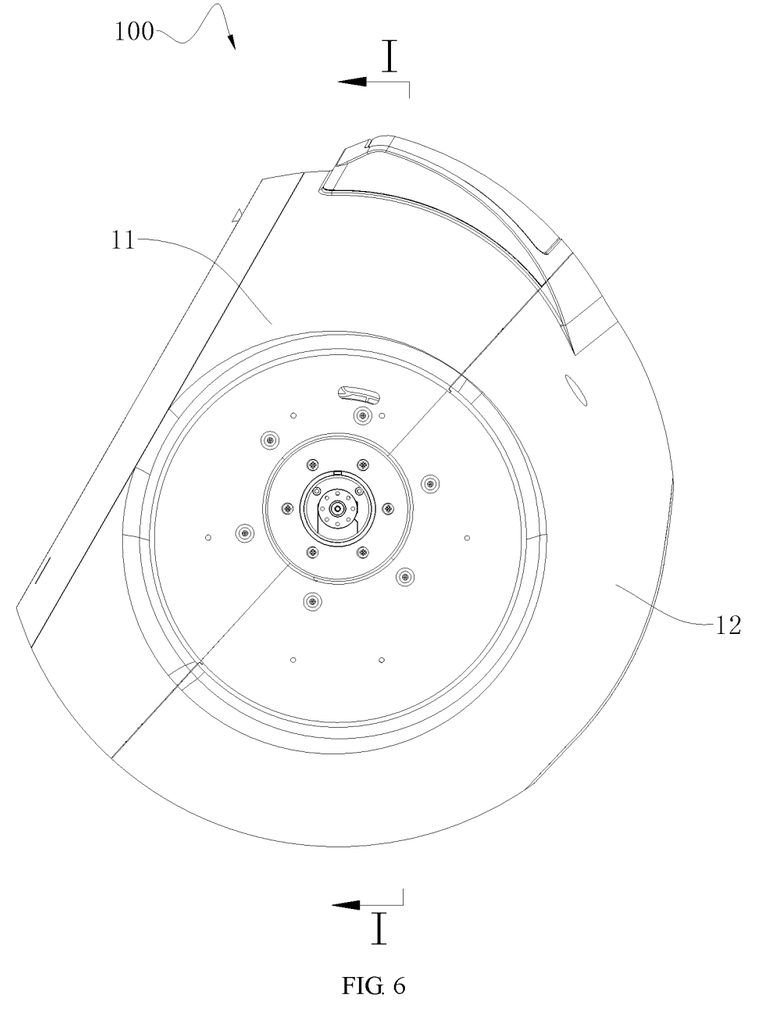
FIG. 6 is a side view of a robot head according to an embodiment of the present disclosure.
Figure 7:
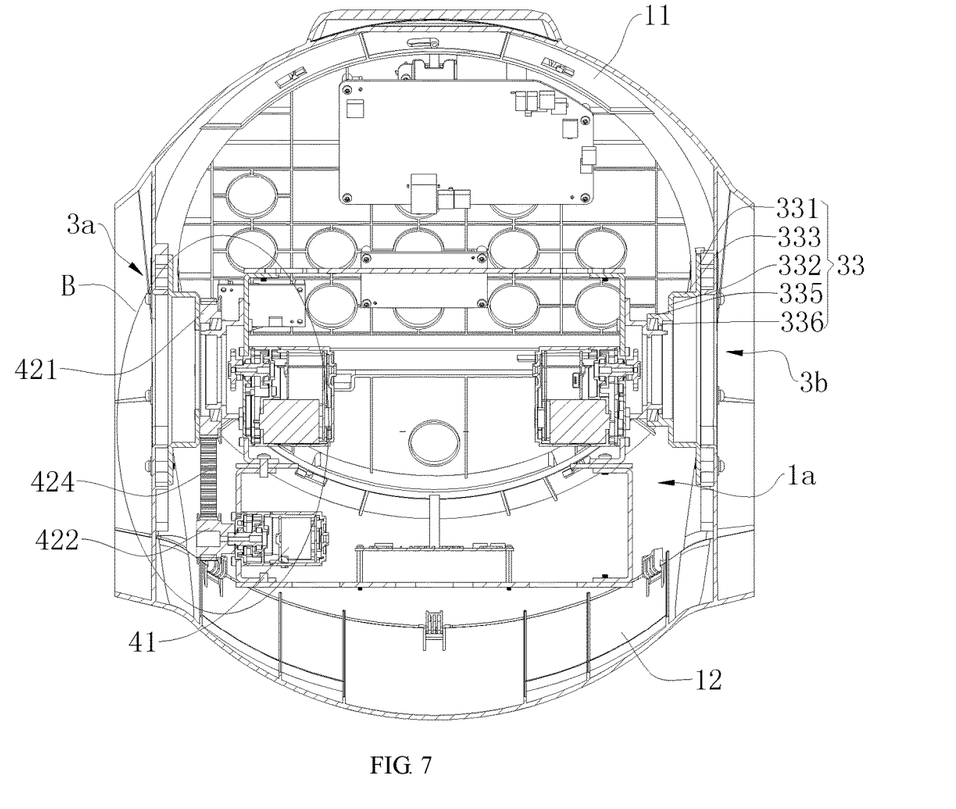
FIG. 7 is a cross-sectional view taken along line I-I of FIG. 6.
Figure 8:
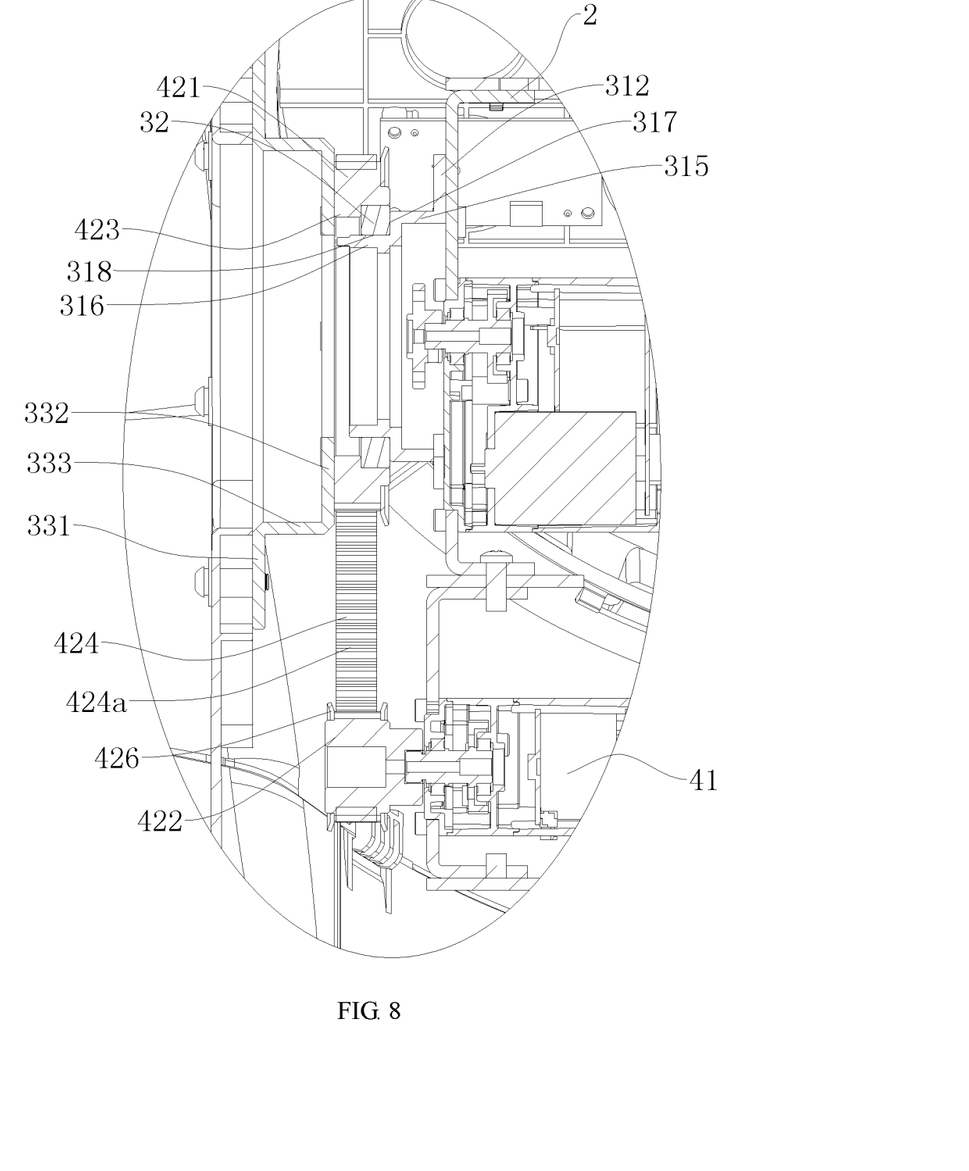
FIG. 8 is an enlarged view of part B of FIG. 7.

Referring to FIG. 1, FIG. 2 and FIG. 4, the robot head rotating structure comprises a robot head 100, a fixing frame 2, at least one set of connection assemblies 3 (e.g., two connection assemblies 3), and a rotary driving apparatus 4. The robot head 100 comprises a housing 1 which defines an internal space 1a. The fixing frame 2 is disposed in the internal space 1a. The connection assemblies 3 are disposed between the housing 1 and the fixing frame 2. Each of the connection assemblies 3 comprises a fixing shaft 31 and a flange 33. The rotary driving apparatus 4 for rotating the flange 33 around the fixing shaft 31 is disposed in the internal space 1a. The fixing shaft 31 is fixedly connected to the fixing frame 2. The flange 33 is rotatably installed to the fixing shaft 31 through a bearing 32, and is fixedly connected to the housing 1.

The above-mentioned robot head rotating structure has the connection assembly 3 disposed between the housing 1 and the fixing frame 2 as well as the rotary driving apparatus 4, which are capable of enabling the housing 1 to rotate with respect to the fixing frame 2. As a result, the robot head 100 is capable of swinging back and forth as the head of a human stably after the rotary driving apparatus 4 is controlled by an external electric signal, and the raising and bowing of the robot head 100 can be realized, which improves the automation of the robot.

Referring to FIG. 1 and FIG. 2, the robot head 100 comprises the housing 1. The housing 1 defines the internal space 1a. The fixing frame 2 is disposed in the internal space 1a.

Referring to FIG. 1 and FIG. 2, the housing 1 is substantially spherical in shape. The above-mentioned components are disposed in the housing 1 and protected by the housing 1. In this embodiment, the housing 1 is rotatable with respect to the fixing frame 2, and an inner wall of the housing 1 can be fixedly installed with an adaption board, a power supply board, etc. The housing 1 comprises a front case 11 and a back cover 12 which are connected with each other, wherein the front case 11 and the back cover 12 enclose to form the inner space 1a. A front side of the front case 11 has a flat surface, and display screen or a camera could be installed on the flat surface. The front case 11 and the rear cover 12 each comprises a side portion for connecting with the flange 33. A wire through hole 13 is provided in a side portion of the front case 11.

Figure 3:
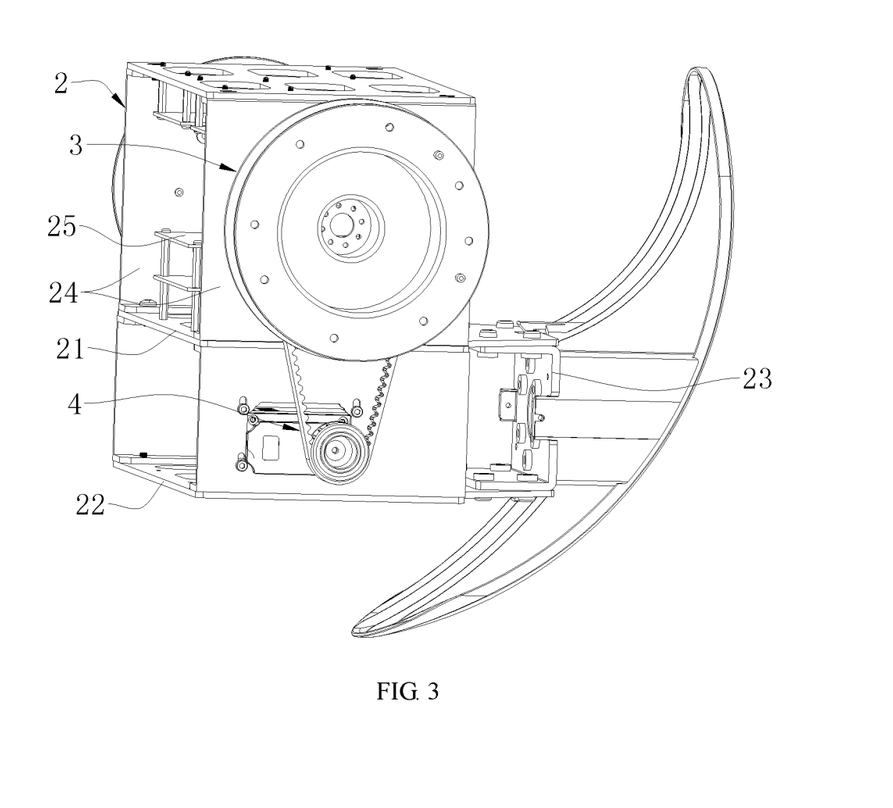
FIG. 3 is a three dimensional view of a fixing frame according to an embodiment of the present disclosure.

Referring to FIGS. 2 to 4, the fixing frame 2, as a rotation supporting structure of the housing 1, is fixedly connected with a support part (not shown) which is in exterior of the housing 1. In this embodiment, the fixing frame 2 is, but not limited to, a square frame with a two-layer structure. The fixing frame 2 comprises an upper plate 21, a lower plate 22 located below the upper plate 21, a locking stand 23, and side plates 24 on two sides of the upper plate 21. The upper plate 21 and the lower plates 22 could be disposed with a supporting plate 25 for placing electrical components. The locking stand 23 is connected between rear sides of the upper plate 21 and the lower plates 22, thereby fixing with the support part.

Referring to FIGS. 2 to 4, the connection assembly 3 is utilized to connect the fixing frame 2 and the housing 1. The connection assembly 3 comprises the fixing shaft 31, the bearing 32, and the flange 33. The fixing shaft 31 is fixedly connected to the side plates 24 of the fixing frame 2. The bearing 32 could be a rolling bearing, and is installed on the fixing shaft 31. The flange 33 is put around the bearing 32, and is fixedly connected to the housing 1. The housing 1 rotates with respect to the fixing frame 2 through the rotation of the flange 33 on the fixing shaft 31. In this embodiment, the amount of the connection assembly 3 is, but not limited to, two sets. The two sets of the connection assemblies 3 are disposed in a bilateral manner about a central line of the fixing frame 2 which is perpendicular to the upper plate 21 and the lower plates 22, and the first bearings 32 on the left and right sides are disposed coaxially. As a result, since the left and right sides of the fixing frame 2 are pivoted to the housing 1, the housing 1 rotates more smoothly with respect to the fixed frame 2, and the rotary structure could be more firm.

For the convenience of description, the two connection assemblies are named as a first connection assembly 3a and a second connection assembly 3b, respectively. The first connection assembly 3a and the second connection assembly 3b are disposed on two sides of the fixing frame 2 in a bilateral manner, and are disposed coaxially. The structure of the first connection assembly 3a and the second connection assembly 3b could be the same or similar. The following will take the first connection assembly 3a as an example for briefly describing the structure of the first connection assembly 3a and the second connection assembly 3b.

Referring to FIGS. 4 to 8, the fixing shaft 31 of the first connection assembly 3a comprises a shaft portion 311 and a chassis portion 312, wherein the shaft portion 311 extends horizontally and is in a cylindrical shape, and the chassis portion 312 is connected to a side of the shaft portion 311. In this embodiment, and a plurality of assembly holes 313 are formed on the chassis portion 312 along a circumferential direction of the chassis portion 312 with intervals between two adjacent assembly holes 313. Screw holes corresponding to the assembly holes 313 are formed on the side plates 24. A screw could sequentially passed through the assembly hole 313 and the screw hole, thereby fixing the fixing shaft 31 to an outside of the fixing frame 2. The chassis portion 312 has a positioning notch 314, and has positioning post(s) 319 protruding therefrom, which facilitate the connection between the fixing shaft 31 and the fixing frame 2. Particularly, the shaft portion 311 comprises a sleeve portion 315 and a support portion 316, wherein the sleeve portion 315 protrudes from a side surface of the chassis portion 312 which away from the fixing frame 2, and the annular support portion 316 extends outwardly from the outer end face of the sleeve portion 315 along the axis of the sleeve portion 315. The outer end surface of the sleeve portion 315 has a first support surface 317 surrounding the outer side of the support portion 316, and the outer circumferential surface of the support portion 316 has a second support surface 318. The bearing 32 could be put around the support portion 316 by tightly matching, and the second support surface 318 abuts against (in contact with) an inner peripheral surface of the bearing 32 while the first support surface 317 abuts against (in contact with) a side end surface of the bearing 32 which close to the fixing frame 2, thereby restraining the movement of the bearing 32 toward the chassis portion 312.

Referring to FIGS. 4 to 8, the flange 33 of the first connection assembly 3a comprises a flange portion 331 for fixedly connected with the housing 1, an assembly portion 332, and a connection portion 333 connected between the flange portion 331 and the assembly portion 332. In this embodiment, the flange portion 331 is substantially in an annular shape. The connection portion 333 extends from the inner edge of the flange portion 331 along the axial direction of the flange portion 331. The assembly portion 332 extends from the inner edge of one end of the connection portion 333 which away from the flange portion 331 along the radial direction of the connection portion 333. A plurality of locking holes 334 are formed on the flange portion 331 along a circumferential direction of the flange portion 331 with intervals between two adjacent locking holes 334. A side portion of the front case 11 and a side portion of the rear cover 12 are each provided with lock holes 14 corresponding to the locking holes 334. After screws pass through the lock hole 14 of the front case 11 and the corresponding locking holes 334 as well as the lock hole 14 of the rear cover 12 and the corresponding locking holes 334, the front case 11 and the rear cover 12 could be fixed to an outside of the flange 33, and the front case 11 and the rear cover 12 are fixedly connected.

Referring to FIGS. 4 to 8, the rotation driving apparatus 4 is utilized to enable the flange 33 of the first connection assembly 3a to rotate, thereby driving the housing 1 to rotate with respect to the fixing frame 2. In this embodiment, the amount of the rotation driving apparatus 4 is, but not limited to, one. The rotation driving apparatus 4 comprises a power source 41 and a transmission mechanism 42 connected between the power source 41 and the flange 33. The power source 41 could be, but is not limited to, a servo, and the transmission mechanism 42 comprises a driven wheel 421 fixedly connected to the flange 33 and a driving wheel 422 for driving the driven wheel 421 to rotate. The driving wheel 422 is connected to an output shaft of the power source 41, and is coaxially disposed with the output shaft, thereby driving the driving wheel 422 to rotate through the output shaft when the power source 41 operates. The housing 1 could rotate with respect to the fixing frame 2 through rotating the rotation driving apparatus 4, which enables the robot head 100 to swing back and forth so as to realize the forward and backward motion of the robot head 100.

Of course, the output shaft of the power source 41 could also be provided with a steering wheel, and the driving wheel 422 could be installed on the steering wheel, so that the power source 41 could drive the steering wheel to rotate the driving wheel 422.

Particularly, referring to FIGS. 4 to 8, a side end face of the driven wheel 421 is locked and fixed by screws with the assembly portion 332 of the flange 33 in the first connection assembly 3a, the driven wheel 421 is rotatably put around the bearing 32, and an inner wall (i.e., inner peripheral surface) of the driven wheel 421 has a limit flange 423 protruding inwardly for restricting the movement of the bearing 32. It is to be noted that, after the driven wheel 421 is put around the shaft portion 311 of the fixing shaft 31, the inner wall of the driven wheel 421 abuts against (in contact with) an outer peripheral surface of the bearing 32 in the first connection assembly 3a, an outer end surface (a side end surface close to the fixing frame 2) of the limit flange 423 abuts against (in contact with) the side end surface of the bearing 32 which away from the fixing frame 2. The driven wheel 421 and the shaft portion 311 jointly define a limitation space for accommodating the bearing 32, and the outer end surfaces of the first support surface 317, the second support surface 318, and the limit flange 423 are positioned in the limitation space to lock the position of the bearing 32. As a result, when the housing 1 rotates, the bearing 32 does not move, and the housing 1, and the housing 1 as well as the fixing frame 2 do not move with respect to each other, hence has better rotational stability.

It should be noted that, in this embodiment, since only one rotation driving apparatus 4 is used, the rotation driving apparatus 4 is connected to the first connection assembly 3a, and the second connection assembly 3b disposed on the other side of the fixing frame 2 is not connected to the rotation driving apparatus 4, hence the main difference between the first connection assembly 3a and the second connection assembly 3b consists in the structure of the flange 33. The flange 33 of the first connection assembly 3a is assembled to the bearing 32 of the first connection assembly 3a through the driven wheel 421. As can be seen from FIG. 7, the flange 33 of the second connection assembly 3b is directly assembled to the bearing 32 of the second connection assembly 3b, and the second connection assembly 3b comprises a flange portion 331 for fixedly connecting with the housing 1, an assembly portion 332, a connection portion 333 connected between the flange portion 331 and the assembly portion 332, an extending portion 335 extending in the axial direction of the flange portion 331 from the assembly portion 332, and a protrusion portion 336 protruding on an inner wall of the extending portion 335. After the flange 33 is put around the shaft portion 311 of the fixing shaft 31, an inner wall of the extending portion 335 abuts against (in contact with) the outer peripheral surface of the bearing 32, and an outer end surface (a side end surface close to the fixing frame 2) of the protrusion portion 336 abuts against (in contact with) the side end surface of the bearing 32 away from the fixing frame 2.

Of course, when two rotation driving apparatus 4 are used, both the first connection assembly 3a and the second connection assembly 3b are connected to the corresponding rotation driving apparatus 4, and the first connection assembly 3a and the second connection assembly 3b have the same structure.

Referring to FIGS. 4 to 8, in this embodiment, the transmission mechanism 42 is a pulley transmission mechanism, wherein the driven wheel 421 and the driving wheel 422 are both pulleys, and the transmission mechanism 42 further comprises a transmission belt 424 wound between the driven wheel 421 and the driving wheel 422. An outer wall (i.e., inner peripheral surface) of the driven wheel 421 has an anti-separation flange 425 protruding outwardly for restricting the movement of the transmission belt 424. An upper end portion of the transmission belt 424 is clamped between the anti-separation flange 425 and the assembly portion 332 to prevent the transmission belt 424 from separating from the driven wheel 421. It should be noted that, the driving wheel 422 also has an anti-separation structure for restricting the movement of the transmission belt 424, wherein the anti-separation structure are two anti-movement flanges 426 formed on an outer wall (i.e., outer peripheral surface) of the driving wheel 422. The two anti-movement flanges 426 are spaced from each other on the axis of the driving wheel 422. A lower end portion of the transmission belt 424 is clamped between the two anti-movement flanges 426 to prevent the transmission belt 424 from separating from the driving wheel 422.

Of course, the transmission mechanism 42 could also be a gear transmission mechanism in which the driven wheel 421 and the driving wheel 422 are both gears, wherein the driven wheel 421 and the driving wheel 422 could engage with each other, or a gear set for transmission could be disposed between the driven wheel 421 and the driving wheel 422, so as to enable the driven wheel 421 to rotate.

Referring to FIGS. 4 to 8, an outer wall of the driven wheel 421 includes a first tooth portion 421a, an outer wall of the driving wheel 422 includes a second tooth portion 422a, wherein the transmission belt 424 is single-sided tooth belt with an inner peripheral surface being a rubber contact surface. An inner peripheral surface of the transmission belt 424 includes a third tooth portion 424a engaged with both the first tooth portion 421a and the second tooth portion 422a. As a result, the belt 424 can be prevented from slipping, and the housing 1 could be easily controlled to flip back and forth.

A connection structure of the robot head 100 and a support base 200 provided in an embodiment will be described in detail with reference to FIGS. 9 to 13.

Figure 9:
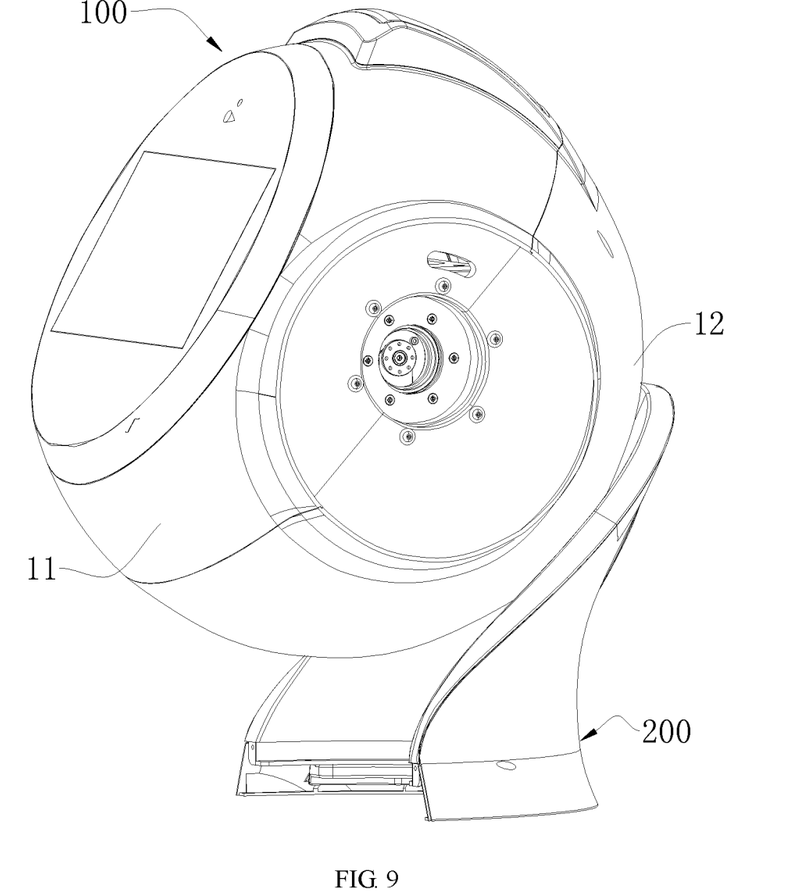
FIG. 9 is a three dimensional view of connecting a robot head and a support base according to an embodiment of the present disclosure.
Figure 10:
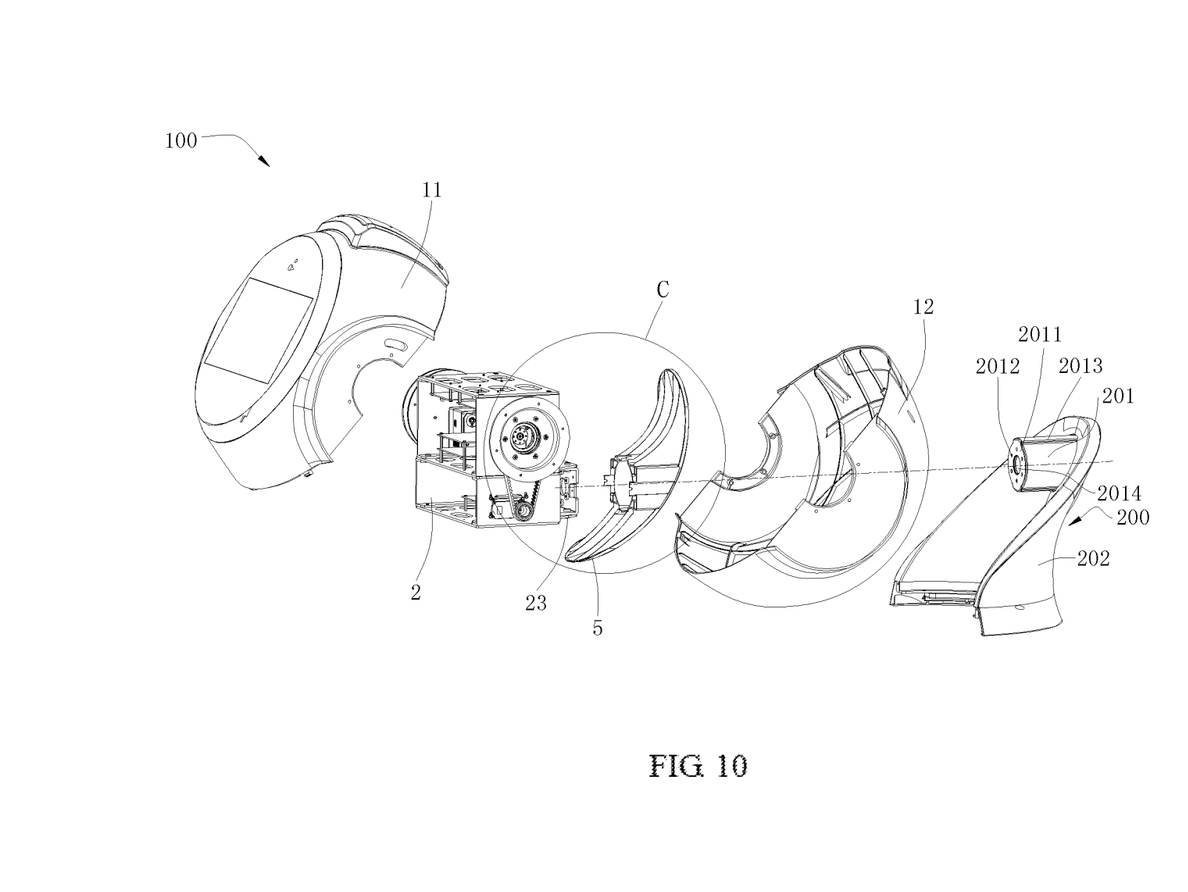
FIG. 10 is an exploded view of a robot head and a support base according to an embodiment of the present disclosure.
Figure 11:
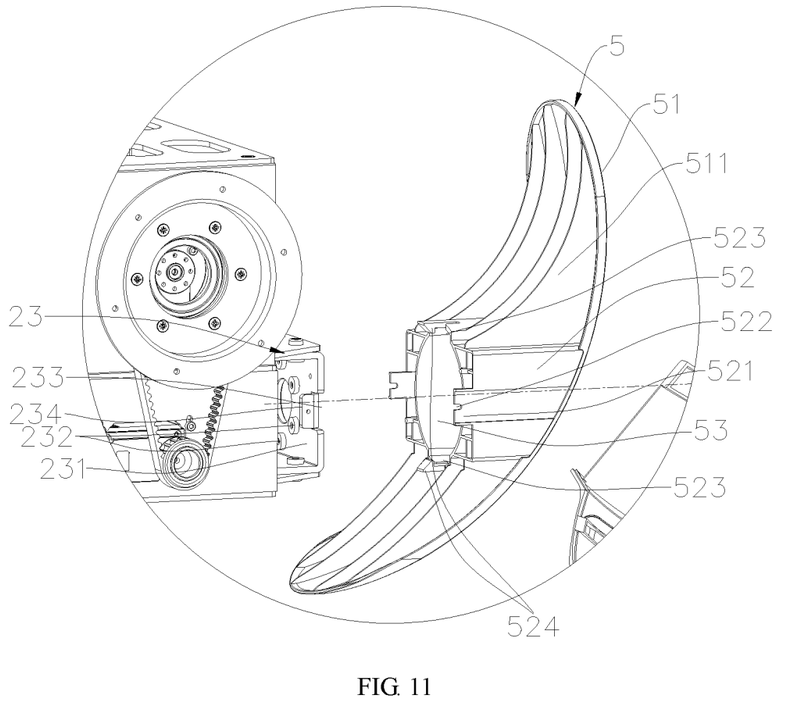
FIG. 11 is an enlarged view of part C of FIG. 10.

Referring to FIGS. 9 to 11, the support base 200 is utilized to support the robot head 100. The support base 200 comprises an installation post 201 and a support wall portion 202. The installation post 201 is connected to the support wall portion 202. In this embodiment, the installation post 201 has a substantially circular cross-section, and the support wall portion 202 has a substantially arc structure which encloses a half of the rear cover 12, which has a shape matching that of the rear cover 12. The support wall portion 202 has a wire groove 2021 for a power cord to insert, thereby facilitating the storage of the power cord. In addition, a decoration cover plate could be installed on an outer side of the support wall portion 202 to conceal the power cord, so as to prevent the power cord from being exposed, thereby protecting the power cord from damage. The housing 1 is rotatably connected to the fixing frame 2 such that the housing 1 is capable of rotating with respect to the fixing frame 2 about the fixing shaft 31. The fixing frame 2 comprises a locking frame 23 for fixedly connecting with the installation post 201.

Figure 12:
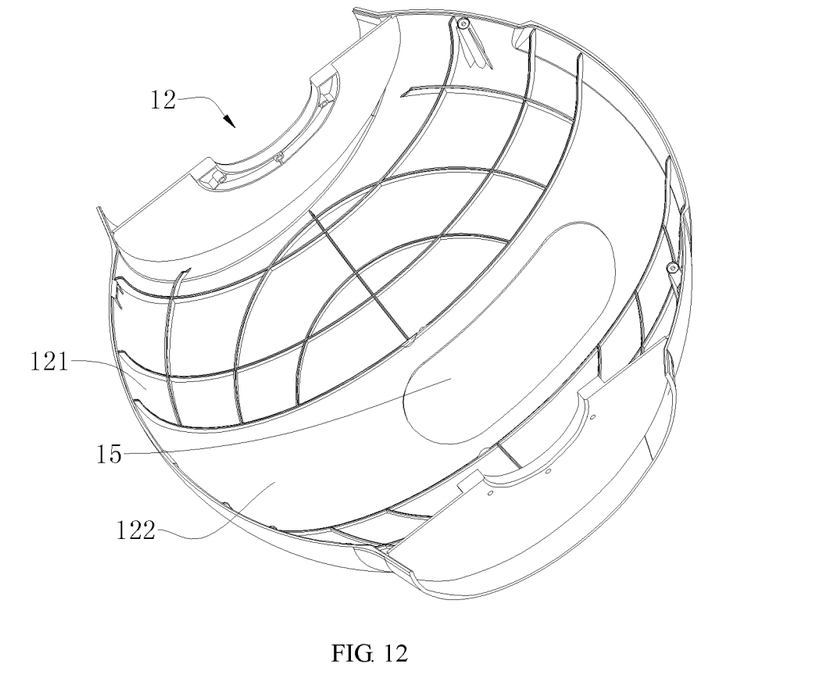
FIG. 12 is a three dimensional view of a back cover according to an embodiment of the present disclosure.
Figure 13:
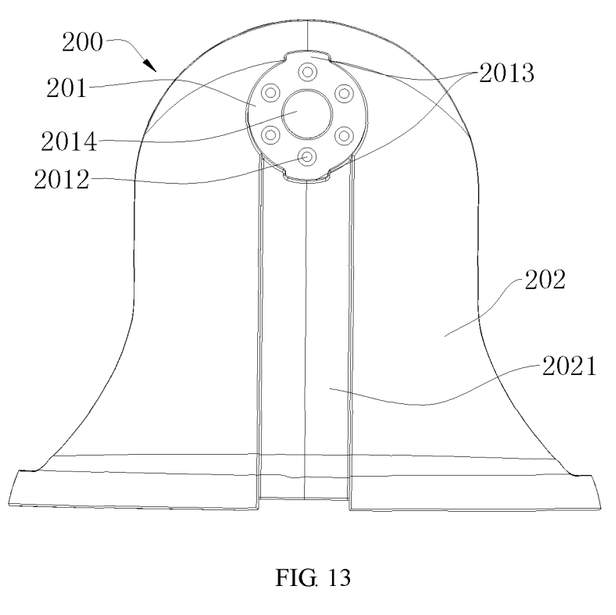
FIG. 13 is a rear view of a support base according to an embodiment of the present disclosure.

Referring to FIG. 12, the rear cover 12 defines an opening 15 for the installation post 201 to pass therethrough. The rear cover 12 comprises a recess 121. The recess 121 has a chute 122, and the opening 15 is on a bottom surface of the chute 122. A shielding part 5 for shielding the opening 15 is disposed in the internal space 1a. The shielding part 5 comprises a circular-arc-shaped baffle 51 for engaging into the chute 122, and the baffle 51 has a combination portion 52 protruding from one side of a middle portion of the baffle 51 for connecting with the installation post 201. In this embodiment, the opening 15 is substantially an elongated waist-like hole, which has a length such that the opening 15 can be shielded when the rear cover 12 rotates with respect to the fixing frame 2. The shape of the chute 122 matches that of the baffle 51, which has a length longer than that of the baffle 51. When the housing 1 rotates with respect to the fixing frame 2, the baffle 51 moves with respect to the rear cover 12 in a longitudinal direction of the chute 122 in the chute 122. In other words, when the housing 1 is rotates about the fixing shaft 31 with respect to the fixing frame 2, that is, when the robot head 100 swings back and forth on the support base 200, the baffle 51 slides up and down in the chute 122 with respect to the rear cover 12, such that the opening 15 can be shielded in any angle of swing.

Referring to FIGS. 10 to 13, the baffle 51 is put around the installation post 201 and supported by the installation post 201. The combination portion 52 has an installation hole 53 for the installation post 201 to pass therethrough, and a fixing mechanism for fixedly connecting the installation post 201 and the locking frame 23 is disposed between the installation post 201 and the locking frame 23. In this embodiment, the locking frame 23 comprises a fixing board 231, the installation post 201 comprises an end cover plate 2011 for abutting against (in contact with) the fixing board 231, and the fixing mechanism comprises a plurality of first fixing hole 2012 formed on the end cover plate 2011 and a plurality of second fixing hole 232 formed on the fixing board 231 which correspond to the first fixing hole 2012. The plurality of first fixing hole 2012 are disposed along the circumferential direction of the end cover plate 2011 with intervals between two adjacent first fixing holes 2012. The installation post 201 can be locked with the locking frame 23 through a screw passing through the first fixing hole 2012 and the corresponding second fixing hole 232.

Referring to FIGS. 10 to 13, two sides of the combination portion 52 are disposed with connection straps 521, and two sides of the fixing board 231 define support slots 233 for the connection straps 521 to slide into. In this embodiment, two connection straps 521 are located on a left side and a right side of the combination portion 52, respectively, and connection ears 234 are formed on a left side and a right side of the fixing board 231, respectively. The connection ears 234 are located in the support slots 233, the connection straps 521 define a guide slot 522, and the connection ears 234 define a screw hole corresponding to the guide slot 522. It is to be noted that, when the shielding part 5 is connected to the locking frame 23, the connection straps 521 are slid into the corresponding support slots 233 first, and screws connected to the screw holes of the connection ears 234 are slid into the guide slots 522 of the connection straps 521. Thus, the fixing frame 2 can be pre-supported on the shielding part 5 to realize the fixing of the fixing frame 2, and the fixing frame 2 can be locked with the installation post 201 through the screws.

Referring to FIGS. 10 to 13, a positioning structure is disposed between the combination portion 52 and the installation post 201. The positioning structure comprises positioning slots 523 formed on the combination portion 52 and protrusion portions 2013 protruding from an outer peripheral surface of the installation post 201. The protrusion portions 2013 are capable of sliding into or out of the positioning slots 523. In this embodiment, the amount of the protrusion portion 2013 is, but is not limited to, two. The protrusion portions 2013 are disposed on the installation post 201 in an up and down symmetrical manner, and extends along the axis of the installation post 201. The shape of the positioning slots 523 matches that of the protrusion portions 2013. Thus, the position of the shielding part 5 can be quickly fixed to prevent the shielding part 5 from rotating about the axis of the installation post 201 with respect to the installation post 201.

Referring to FIGS. 10 to 13, the combination portion 52 is disposed with limit clips 524 for restricting the movement of the combination portion 52 with respect to the installation post 201. In this embodiment, the amount of the limit clips 524 is, but is not limited to, two. The limit clips 524 are disposed on the installation post 201 in an up and down symmetrical manner. The limit clips 524 are formed in the positioning slots 523. It can be comprehended that, the limit clips 524 abut against (in contact with) the protrusion portions 2013 of the installation post 201 to restrict the movement of the baffle 51 toward the support wall portion 202 after the baffle 51 is assembled on the installation post 201.

Of course, it is also possible to form a magazine on the protrusion portions 2013 to engage with the limit clip 524. Thus, after the limit clip 524 is engaged with the magazine, the movement of the baffle 51 with respect to the installation post 201 can be restricted.

As a further optimization, the installation post 201 has a hollow structure, and the end cover plate 2011 defines a wire hole 2014. The first fixing hole 2012 surrounds an outer periphery of the wire hole 2014, such that the power core can pass through the wire hole 2014.

As a further optimization, the baffle 51 has reinforcing bar(s) 511, so as to strengthen the baffle 51.

As a further optimization, an edge of the opening 15 of the rear cover 12 is installed with a soft washer (not shown), so as to prevent the rear cover 12 from the damage caused by the collision with the installation post 201 and reduce the noise generated during rotation.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A robot head rotating structure, comprising:
   a robot head comprising a housing defining an internal space;
   a fixing frame disposed in the internal space;
   at least one connection assembly disposed between the housing and the fixing frame; and
   a rotary driving apparatus disposed in the internal space;
   wherein the connection assembly comprises a fixing shaft fixedly connected to the fixing frame and a flange rotatably installed to the fixing shaft, the flange is fixedly connected to the housing, and the rotary driving apparatus is utilized to rotate the flange around the fixing shaft, and wherein the housing is spherical in share and comprises a front case and a rear cover, the front case and the rear cover enclose to form the internal space, and the front case is locked with the rear cover through the flange.

2. The robot head rotating structure of claim 1, wherein the flange is rotatably installed to the fixing shaft through a bearing, the fixing shaft comprises a shaft portion and a chassis portion, the chassis portion is connected to one end of the shaft portion to be fixedly connected with the fixing frame, and the bearing is put around the shaft portion and is supported by the shaft portion.

3. The robot head rotating structure of claim 2, wherein the shaft portion comprises a sleeve portion and a support portion, the sleeve portion protrudes from a side surface of the chassis portion away from the fixing frame, and the support portion is annular and protrudes from an outer end surface of the sleeve portion and extends outwardly along the axis of the sleeve portion, the outer end face of the sleeve portion has a first support surface abutting against a side end surface of the bearing, the first support surface surrounds an outer side of the support portion, an outer peripheral surface of the support portion has a second support surface abutting an inner peripheral surface of the bearing.

4. The robot head rotating structure of claim 1, wherein the rotary driving apparatus comprises a power source and a transmission mechanism; wherein the transmission mechanism is connected between the power source and the flange, the transmission mechanism comprises a driven wheel fixedly connected with the flange and a driving wheel for driving the driven wheel to rotate, and the driving wheel is connected to the power source.

5. The robot head rotating structure of claim 4, wherein the flange is rotatably installed to the fixing shaft through a bearing, the driven wheel is rotatably put around the bearing, and a limit flange for restricting the movement of the bearing protrudes inwardly from an inner wall of the driven wheel.

6. The robot head rotating structure of claim 4, wherein the transmission mechanism further comprises a transmission belt wound between the driven wheel and the driving wheel, an anti-separation flange for restricting the movement of the transmission belt protrudes outwardly from an outer wall of the driven wheel.

7. The robot head rotating structure of claim 6, wherein an outer wall of the driven wheel comprises a first tooth portion, an outer wall of the driving wheel comprises a second tooth portion, an inner peripheral surface of the transmission belt comprises a third tooth portion engaging with both the first tooth portion and the second tooth portion.

8. The robot head rotating structure of claim 5, wherein the flange comprises an annular flange portion for fixedly connecting with the housing, an assembly portion for fixedly connecting with the limit flange, and a connection portion connected between the flange portion and the assembly portion.

9. The robot head rotating structure of claim 1, further comprising two connection assemblies, wherein the two connection assemblies are disposed on two sides of the fixing frame in a bilateral manner.

10. The robot head rotating structure of claim 1, further comprising a support base for supporting the robot head, wherein the support base has an installation post, the fixing frame comprises a locking frame for fixedly connecting with the installation post, the housing defines an opening for the installation post to pass therethrough, and a shielding part for shielding the opening is disposed in the internal space.

11. The robot head rotating structure of claim 10, wherein the housing comprises a front case and a back cover connecting with each other, the rear cover comprises a recess having a chute, the opening is on a bottom surface of the chute; wherein the shielding part comprises a circular-arc-shaped baffle for engaging into the chute, and the baffle has a combination portion protruding from one side of a middle portion of the baffle for connecting with the installation post.

12. The robot head rotating structure of claim 11, wherein the baffle is put around the installation post and supported by the installation post, the combination portion has an installation hole for the installation post to pass therethrough, and a fixing mechanism for fixedly connecting the installation post and the locking frame is disposed between the installation post and the locking frame.

13. The robot head rotating structure of claim 12, wherein the locking frame comprises a fixing board, the installation post comprises an end cover plate for abutting against the fixing board, and the fixing mechanism comprises a first fixing hole formed on the end cover plate and a second fixing hole formed on the fixing board and corresponding to the first fixing hole.

14. The robot head rotating structure of claim 13, wherein two sides of the combination portion are disposed with connection straps, and two sides of the fixing board define support slots for the connection straps to slide into.

15. The robot head rotating structure of claim 12, wherein a positioning structure is disposed between the combination portion and the installation post, and the positioning structure comprises a positioning slot formed on the combination portion and a protrusion portion protruding from an outer peripheral surface of the installation post and being capable of sliding into or out of the positioning slot.

16. The robot head rotating structure of claim 12, wherein the combination portion is disposed with a limit clip for restricting the movement of the combination portion with respect to the installation post.

17. The robot head rotating structure of claim 13, wherein the installation post has a hollow structure, and the end cover plate defines a wire hole.

18. The robot head rotating structure of claim 11, wherein the baffle has a reinforcing bar.

19. The robot head rotating structure of claim 10, wherein the support base further comprises a support wall portion, the installation post is connected to the support wall portion, and the support wall portion has a wire groove.

20. A robot head rotating structure, comprising:
a robot head comprising a housing, the housing comprising a front case and a rear cover, the front case and the rear cover enclosing to form an internal space;
a fixing frame disposed in the internal space;
at least one connection assembly disposed between the housing and the fixing frame; and
a rotary driving apparatus disposed in the internal space;
wherein the connection assembly comprises a fixing shaft fixedly connected to the fixing frame and a flange rotatably installed to the fixing shaft, the flange is fixedly connected to the housing, and the rotary driving apparatus is configured to rotate the flange around the fixing shaft, and
wherein the front case and the rear cover are rotatable about the fixing shaft, and the fixing shaft is located within the internal space.

* * * * *